(12) United States Patent
Cook et al.

(10) Patent No.: US 8,610,976 B1
(45) Date of Patent: Dec. 17, 2013

(54) IMAGE ENHANCEMENT METHODS

(75) Inventors: Gerald P. Cook, Bromsash (GB); Anthony D. Jacques, Hampshire (GB)

(73) Assignee: 3M Innovative Properties Company, St. Paul, MN (US)

( * ) Notice: Subject to any disclaimer, the term of this patent is extended or adjusted under 35 U.S.C. 154(b) by 23 days.

(21) Appl. No.: 13/534,584

(22) Filed: Jun. 27, 2012

(51) Int. Cl.
*H04N 1/46* (2006.01)

(52) U.S. Cl.
USPC .......... 358/504; 358/463; 358/509; 358/517; 382/254; 382/274

(58) Field of Classification Search
USPC ......... 358/453, 463, 464, 475, 504, 505, 509, 358/515–520, 3.26, 3.27; 382/100, 108, 382/112, 135, 137, 139, 140, 168, 190, 254, 382/274, 312, 321; 345/20, 581, 589, 606, 345/612
See application file for complete search history.

(56) References Cited

U.S. PATENT DOCUMENTS

| 6,088,470 | A | 7/2000 | Camus |
| 6,088,612 | A | 7/2000 | Blair |
| 6,269,169 | B1 | 7/2001 | Funk et al. |
| 6,288,842 | B1 | 9/2001 | Florczak |
| 6,714,665 | B1 * | 3/2004 | Hanna et al. ................. 382/190 |
| 7,136,537 | B2 | 11/2006 | Pilu |
| 7,626,585 | B2 * | 12/2009 | Kondo et al. ................. 345/426 |
| 7,639,400 | B2 * | 12/2009 | Hains ........................... 358/3.06 |
| 7,737,975 | B2 * | 6/2010 | Sato et al. ..................... 382/174 |
| 8,184,194 | B2 * | 5/2012 | Sato et al. ..................... 382/162 |
| 2003/0170425 | A1 | 9/2003 | Mann |
| 2004/0047491 | A1 | 3/2004 | Rydbeck |
| 2007/0092132 | A1 * | 4/2007 | Sato et al. ..................... 382/154 |
| 2007/0222781 | A1 * | 9/2007 | Kondo et al. ................. 345/581 |
| 2008/0084499 | A1 | 4/2008 | Kisacanin et al. |
| 2008/0193860 | A1 * | 8/2008 | Hains ............................ 358/1.9 |
| 2009/0002774 | A1 | 1/2009 | King |
| 2012/0113443 | A1 * | 5/2012 | Itoh et al. ....................... 358/1.9 |
| 2013/0010100 | A1 * | 1/2013 | Kotaki et al. .................. 348/80 |

FOREIGN PATENT DOCUMENTS

| EP | 1 968 010 | 2/2008 |
| EP | 1 349 487 | 9/2009 |
| EP | 2 339 534 | 11/2009 |
| WO | WO 99/38121 | 7/1999 |
| WO | WO 02/49506 | 6/2002 |

OTHER PUBLICATIONS

PCT International Search Report from PCT/US2013/044096 mailed on Aug. 22, 2013, 4 pages.
3M™ AT9000 Full Page Reader, Technical Data Sheet, Issued May 31, 2011, 4 pages.
Seibert, J. Anthony et al., "Flat-field correction technique for digital detectors", The International Society for Optical Engineering 1998 SPIE, vol. 3336, 1998, pp. 348-354.

* cited by examiner

*Primary Examiner* — Kimberly A Williams
(74) *Attorney, Agent, or Firm* — Sandra K. Nowak

(57) ABSTRACT

Methods of image enhancement are disclosed. In one aspect, the method of image enhancement is for use with an image capture device, such as a security document reader, for the attenuation, separation or reduction of reflections from objects, such as security documents.

18 Claims, 5 Drawing Sheets

IMAGE ENHANCEMENT METHODS

Security documents such as passports, identification cards, national healthcare cards, driver's licenses, entry passes, ownership certificates, financial instruments, and the like, are often assigned to a particular person by personalization data. Personalization data, often present as printed images, can include photographs, signatures, fingerprints, personal alphanumeric information, and barcodes, and allows human or electronic verification that the person presenting the document for inspection is the person to whom the document is assigned. There is widespread concern that forgery techniques can be used to alter the personalization data on such a document, thus allowing non-authorized people to pass the inspection step and use the document in a fraudulent manner.

A number of security features have been developed to help authenticate the document of value, thus assisting in preventing counterfeiters from altering, duplicating or simulating a document of value. Some of these security features may include overt security features or covert security features. Overt security features are features that are easily viewable to the unaided eye, such features may include holograms and other diffractive optically variable images, embossed images, and color-shifting films. In contrast, covert security features include images only visible under certain conditions, such as inspection under light of a certain wavelength, polarized light, or retroreflected light. One example of a laminate that includes both overt and covert security features is 3M™ Confirm™ Laminate with Floating Image Technology, which is commercially available from 3M Company based in St. Paul, Minn. This security laminate may be used with security documents, such as identification cards, badges and driver licenses, and assists in providing identification, authentication and to help protect against counterfeiting, alteration, duplication, and simulation. Another example of a laminate that includes both overt and covert security features is illustrated in U.S. Pat. Publication No. 2003/0170425 A1 "Security Laminate," (Mann et al.).

In recent years there has been widespread adoption of automated reading of security documents at border entry points and other situations where the identity of a document holder requires verification. Automated reading ranges from an optical scan of OCR-readable data to the interrogation of an RFID chip within a passport or identification card, which may then involve further checking by an operator or verification by an automated system such as an e-passport gate as found in major airports. Data may also be contained in a magnetic strip or transferred wirelessly depending on the format of the document in which identity information is contained.

Optical reading of a security document is typically carried out with document readers using one or a combination of visible, infrared and ultraviolet light, depending on the information being retrieved. Often overt and covert optical security features, such as those discussed above, are included within security documents to allow the document itself to be authenticated as genuine. As discussed, covert security features may only be visible under certain illumination, such as infrared or ultraviolet light, or may, such as with a hologram, provide variable information when illuminated from different directions. In each case the security document is typically read by placing the document on a glass platen of a document reader, such that the information contained on the portion of the document in contact with the platen is illuminated from within the document reader. Light reflected by the document is reflected back into the reader and processed to form an image of the information (e.g. text or covert or overt security features) required. The quality of the image captured is affected greatly by the manner in which the document reflects the incident light.

A variety of security readers are known in the art. For example, U.S. Pat. No. 6,288,842, "Security Reader for Automatic Detection of Tampering and Alteration, (Mann) discloses a security reader for reading and processing information about security laminates. One example of a passport reader is commercially available from 3M Company based in St. Paul, Minn., as the 3M™ Full Page Reader.

Image enhancement by removal of unwanted reflections in image capture devices is disclosed in U.S. Pat. No. 7,136,537, "Specular Reflection in Captured Images," (Pilu et al.). In order to remove specular reflections, two images are taken, one containing specular reflections and one where such reflections are absent. These images are blended together to create an image with reduced specular reflection, allowing underlying features to be seen. The apparatus used to achieve this effect is provided with an adjustor that is able to vary the amount of specular reflection appearing in the final image. Images are taken with one or more strobes or flashes from various directions relative to the object being imaged, and relies on each image having an absence of glare patches seen in another image. Such a method therefore takes into account reflections generated by ambient light conditions, and is not suitable for use in a document reader, for example, where illumination is well controlled and reflection features are generated by artefacts in the document being imaged, rather than artefacts generated by variations in ambient illumination.

SUMMARY

One aspect of the present invention provides an image enhancement method for an image capture device. This method comprises: illuminating an object placed on, in or adjacent to the image capture device and capturing an image of the object from a first position to obtain a first set of raw pixel data; illuminating the object placed on, in or adjacent to the image capture device and capturing an image of the object from a second position, to obtain a second set of raw pixel data, wherein each pixel in the second set of raw pixel data corresponds to a pixel in the first set of raw pixel data representing a point on the object; calibrating each of the first and second sets of raw pixel data using a set of image calibration pixel data to create a first set of image pixel data and a second set of pixel image data; and calculating a first set of final image data by: comparing the first and second sets of image pixel data; for pixels representing the same point on the object, selecting the pixel with the lowest pixel intensity; and including said pixel in the first set of final image data.

The above summary of the present invention is not intended to describe each disclosed embodiment or every implementation of the present invention. The Figures and the detail description, which follow, more particularly exemplify illustrative embodiments.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
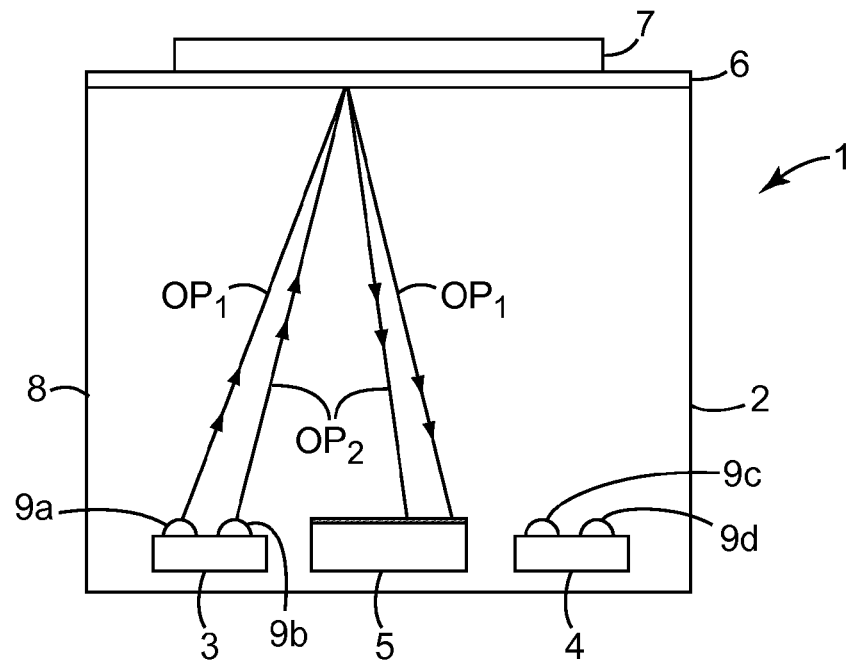
FIG. 1 is a schematic side view of a document reader in which an embodiment of the method of the present invention is carried out.

Security documents such as passports, identification cards, and the like, may often have either a matte or a shiny finish, and is unlikely to be completely flat. During use, corners of plastic bio-data pages in passports, for example, may bend, air bubbles and dirt may become trapped within a laminate structure, or a surface material may be highly reflective and shiny in appearance, all of which can create unwanted reflections, generally specular reflections, thus distorting the captured image. This may make machine readable text, such as OCR text, overt and covert security features difficult to read, and make automatic authentication of the document and/or verification of the holder unreliable or impossible. For example, a bio-data page having a laminate construction with an extremely shiny surface may require additional inspection by an operator if specular reflections distort the image beyond the capability of an automatic reader.

With the various constraints on security document imaging in mind, there is a need for a method that allows the image taken by a standard security document reader to be enhanced sufficiently that stray and unwanted reflections are no longer an issue, such that the document can be authenticated reliably and accurately regardless of surface quality or illumination conditions. Such a method may also find applications in other image capture techniques.

The present invention aims to address these issues by providing an image enhancement method for an image capture device; the method comprising the steps of: illuminating an object placed on, in or adjacent to the image capture device and capturing an image of the object from a first position to obtain a first set of raw pixel data; illuminating the object placed on, in or adjacent to the image capture device, capturing an image of the object from a second position, different to the first position, to obtain a second set of raw pixel data, where each pixel in the second set of raw pixel data corresponds to a pixel in the first set of raw pixel data representing a point on the object; calibrating each of the first and second sets of raw pixel data using a first set of image calibration pixel data to create a first set of image pixel data and using a second set of image calibration pixel data to create a second set of pixel image data respectively, where each pixel in the second set of image calibration pixel data corresponds to a pixel in the first set of image calibration pixel data, and each pixel in the first and second sets of image calibration pixel data corresponds to a pixel in each of the first and second sets of raw pixel data respectively; for a first pixel in the first set of image pixel data: i) calculating the modulus of the pixel intensity of said pixel in the first set of image pixel data minus the pixel intensity of the corresponding pixel in the second set of image pixel data and comparing the modulus to a predetermined threshold value; ii) if the modulus is greater than the threshold value, selecting the one of the pixel in the first set of image pixel data and the pixel in the second set of image pixel data with the lowest pixel intensity as the output pixel; iii) if the modulus is less than the threshold value, determining the one of the corresponding pixel in the first set of image calibration pixel data and the corresponding pixel in the second set of image calibration pixel data having the highest pixel intensity, and selecting the corresponding pixel in either the first set of image pixel data or the second set of image pixel data as the output pixel; and repeating steps i), ii) and iii) for at least a second pixel in the first set of image pixel data and forming a set of final pixel data from the resulting output pixels.

The advantage of using such an approach is that only pixels representing a portion of an image in which a reflection is absent are used to make up the set of final image data, thus ensuring that any image recovered is of a high quality with reflections either attenuated or removed. In some circumstances, reflections may in fact be separated, for example, specular reflections are removed but reflections from single color features remain. This is particularly advantageous for a security document, such as an identity document or a fiduciary document, where covert or overt security features may be revealed as single color reflections.

In one aspect of the present invention, the object is illuminated with visible light, infra-red light or ultraviolet light. In another aspect of the present invention, when the object is illuminated with visible light, the object is illuminated with white light.

In another aspect of the present invention, the pixel intensity may have balanced red-green-blue components. Alternatively, the pixel intensity has un-balanced red-green-blue components. In this case, preferably the pixel intensity has a maximum red, green or blue component.

In another aspect of the present invention, the method may further comprise: for each pixel in the first and second sets of raw pixel data, measuring the intensity of single color reflections, and for pixels representing the same region of the object, selecting the pixel with the brightest single color intensity; and including said pixel in a second set of final image data.

In yet another aspect of the present invention, the method may also further comprise the step of adjusting the first and second sets of raw image data with a gamma correction.

In another aspect of the present invention, the image enhancement output includes the attenuation, separation or removal of reflections. In yet another aspect of the present invention, the image enhancement output includes the attenuation, separation or removal of specular reflections. In another aspect of the present invention, the method may also further comprise: for each of the first and second sets of raw pixel data, compensating the intensity values of each pixel for ambient light. In this case, the method may also further comprise: creating a set of ambient pixel data by imaging the object under no illumination other than ambient light; and subtracting the set of ambient pixel data from each of the first and second sets of raw pixel data.

Preferably the object is a security document. More preferably the object is an identity document or a fiduciary document. Yet more preferably the object is one of a passport, an identification card or a driver's licence. In each of these situations, preferably the image capture device is a security document reader.

In the present invention, the use of masking techniques are used to create an image of an object, such as a security document, that is substantially free of unwanted reflections, as explained in further detail below. The method comprises illuminating an object placed on, in or adjacent to an image capture device such as a security document reader, so as to capture an image of the object from a first position to obtain a first set of raw pixel data. Next, a step of illuminating the object placed on, in or adjacent to the image capture device, capturing an image of the object from a second position is carried out, where the second position is different to the first. This is to obtain a second set of raw pixel data, where each pixel in the second set of raw pixel data corresponds to a pixel in the first set of raw pixel data representing a point on the object. Since there is a positional difference in the two images, calibrating each of the first and second sets of raw pixel data is preferred. This is done using a first set of image calibration pixel data to create a first set of image pixel data and using a second set of image calibration pixel data to create a second set of pixel image data respectively, where each pixel in the second set of image calibration pixel data corresponds to a pixel in the first set of image calibration pixel data, and each pixel in the first and second sets of image calibration pixel data corresponds to a pixel in each of the first and second sets of raw pixel data respectively. At this point, it is preferred to carry out an operation to mask the reflections detected to produce an enhanced image of the object. Starting with a first pixel in the first set of image pixel data, the modulus of the pixel intensity of the pixel in the first set of image pixel data minus the pixel intensity of the corresponding pixel in the second set of image pixel data is calculated, and compared to the modulus to a pre-determined threshold value. If the modulus is greater than the threshold value, the one of the pixel in the first set of image pixel data and the pixel in the second set of image pixel data with the lowest pixel intensity is selected as the output pixel. If the modulus is less than the threshold value, then the one of the corresponding pixel in the first set of image calibration pixel data and the corresponding pixel in the second set of image calibration pixel data having the highest pixel intensity is determined. The corresponding pixel in either the first set of image pixel data or the second set of image pixel data is selected as the output pixel. These steps are then repeated for sufficient pixels in the first set of image pixel data, so as to render an image from a set of final pixel image data formed from the resulting output pixels.

By using such a masking technique described above, an image substantially without reflections is revealed. Such a method is particularly suitable for use with a security document. By attenuating, separating or removing unwanted reflections, in particular, specular reflections, the reliability of automated authentication of a security document, either by text or overt security feature recognition or by revelation of covert security features is improved.

In the following embodiments, the example of a security document and security document reader is used. However, as described below, in alternative embodiments, the method of the present invention suitable for use with other objects and image capture devices.

FIG. 1 is a schematic side view of a document reader in which an embodiment of the method of the present invention is carried out. The document reader 1 is generally cuboid in shape, and comprises a housing 2 in which first 3 and second 4 illumination sources and an image capture device 5 are positioned. The uppermost surface of the housing 2 is formed from a glass platen 6, onto which a security document 7 may be placed in order to be imaged. In this embodiment, in order to enable illumination of the document from a first and a second direction, the first 3 and second 4 lighting sources are positioned on either side of the image capture device 5, which is disposed centrally within the housing 2 adjacent a wall 8 of the housing. Each illumination source 3, 4 is provided with a linear array of light emitting diodes 9a, 9b, 9c, 9d (only two of which are shown on each of the first 3 and second 4 lighting sources for clarity), aligned to illuminate the entire surface of a security document 7 in contact with the glass platen 6. Light travels along the optical paths $OP_1$ and $OP_2$ to be incident on the glass platen 6 and document 7, and reflected back to the surface of the image capture means 5. Non-limiting example optical paths are shown for the first illumination means 3 only. Second illumination source 4 may include similar optical paths, although not illustrated. Preferably the light emitting diodes emit light in the visible range of the electromagnetic spectrum, with suitable LEDs being available from Osram Opto Semiconductors under the product code "TOPLED Ultra White 2PLCC". The image capture means 5 is preferably a CMOS device, such as the MT9T001 ½ inch 3-megapixel digital image sensor, available from Micron Technologies, Inc., located in Boise, Id., USA.

Figure 2:
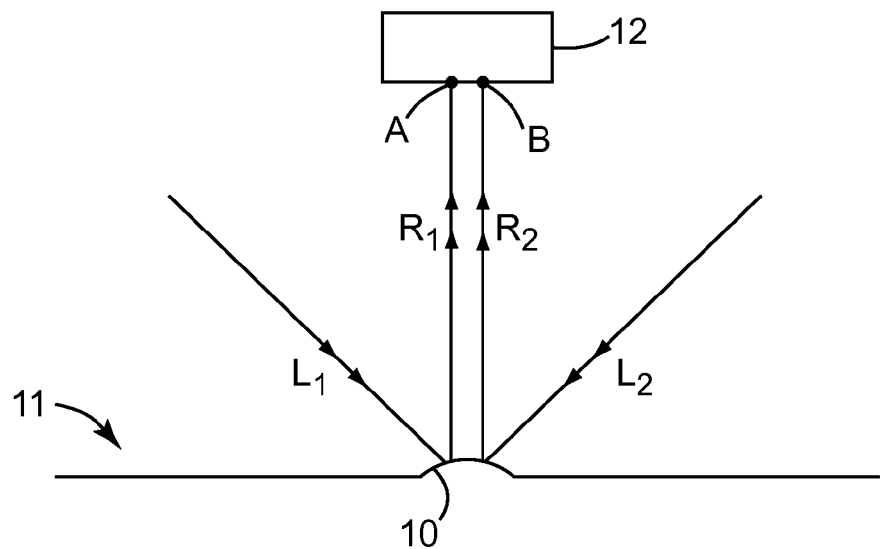
FIG. 2 is a schematic side view of one type of optical defect in a security document giving rise to a specular reflection.

The document reader 1 illustrated in FIG. 1 is arranged so as to enable a method involving imaging a security document from a first and a second direction, where the second direction is different from the first direction. Using two different illumination directions allows images of the same point on the security document to be taken that yield different optical effects. This is generally illustrated in FIG. 2. FIG. 2 is a schematic side view of an optical defect in a security document giving rise to a specular reflection. Specular reflections may be anything that includes an optical glare reflecting back from a surface. Examples of specular reflection in a security document may be caused an uneven laminate, uneven surface that is not optically flat, or the material itself, such extra shiny laminates. In general, specular reflections are mirror or glass-like reflections. In the case of a security reader, there are artifacts or material properties in the security laminates of a security document that cause bright white spots where the light from the light source(s) is reflected back to the image capture device. As one example, optical defect 10 is present in the surface of a security document 11, in this case, a bubble in a laminated bio-data page structure. Light from a first direction $L_1$ is incident on a first side of the defect 10 and reflected $R_1$ onto an image capture device 12. This gives an image with a bright spot corresponding to reflection from the surface of the defect 10 on which the light $L_1$ was incident. Light from a second direction $L_2$ is incident on a first side of the defect 10 and reflected $R_2$ onto an image capture device 12. This gives an image with a bright spot corresponding to reflection from the surface of the defect 10 on which the light $L_2$ was incident. These two images of the same section of the security document 11 will appear to be subtly different when compared to each other. When light reflected from the defect 10 is incident on the image capture device 12 different pixel intensities for the same point on the security document are obtained as follows. The image capture device 12 contains an array of cells each of which has a one-to-one relationship with a pixel in an image of the security document 11. When illuminated from a first direction with light $L_1$ the first set of raw pixel data obtained will contain a bright pixel at the point where the reflection $R_1$ is incident on the image capture device, at position A. When illuminated from a second direction with light $L_2$ the second set of raw pixel data obtained will contain a bright pixel at the point where the reflection $R_2$ is incident on the image capture device, at position B. When these two data sets are combined the darkest pixel (e.g. the pixel with the lowest pixel intensity measure for each equivalent pixel) will be found in the second raw pixel data set at point A and in the first raw pixel data set at point B. A final image formed from combining data based on these two data sets and using only the "darkest" pixels or pixels with the lowest pixel intensity measured at each position on the security document such that reflections from the defect 10 are effectively removed from this final image. This is possible as each pixel in the second set of raw pixel data corresponds to a pixel in the first set of raw pixel data representing a point on the security document.

Figure 3A:
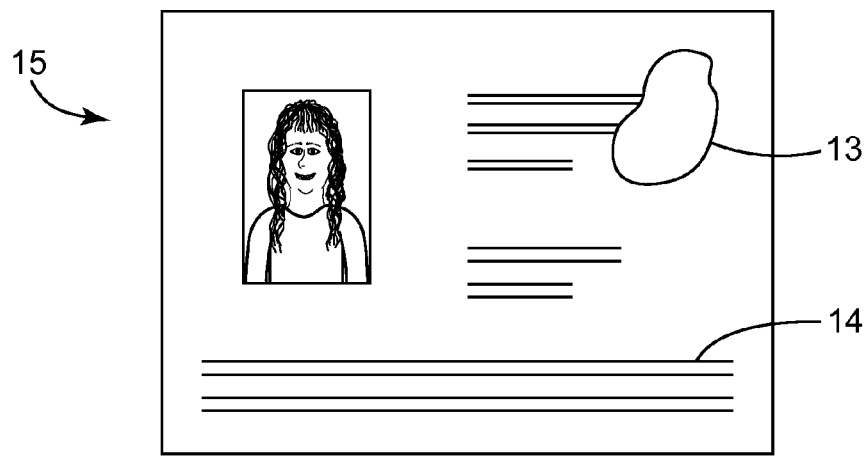
FIG. 3A is a schematic illustration of an image of a passport bio-data page illuminated from a first direction to show a first reflection feature.
Figure 3B:
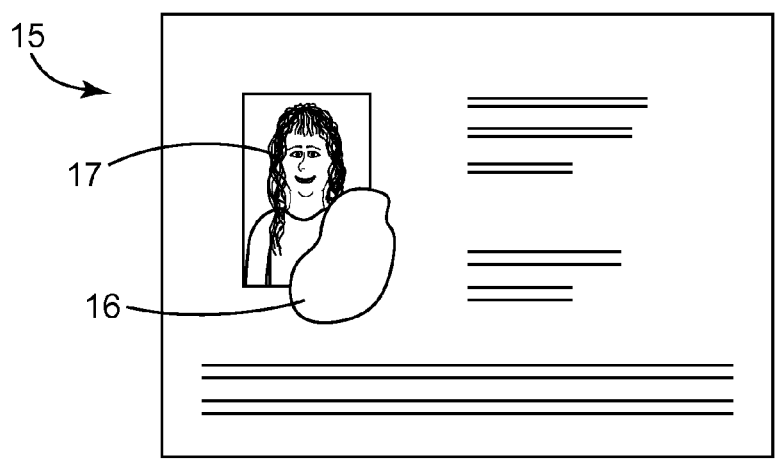
FIG. 3B is a schematic illustration of an image of a passport bio-data page illuminated from a second direction to show a second reflection feature.
Figure 3C:
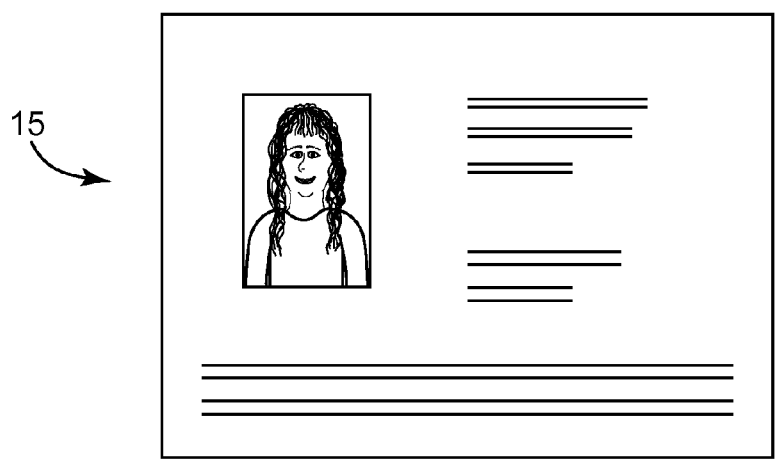
FIG. 3C is a schematic illustration of an image of the passport bio-data page of FIGS. 3A and 3B with no reflection features visible.

This idea is illustrated further in FIGS. 3A, 3B and 3C. FIG. 3A is a schematic illustration of an image of a passport bio-data page illuminated from a first direction $L_1$ to show a first reflection feature. A bio-data page is chosen in this example as typically this is comprised of a multilayer laminated structure with at least one plastic or reflective layer or region on the page containing identity information about the passport bearer. However, the method described below is equally suitable for any page or surface of a security document that requires imaging for bearer identification and/or document authentication to take place. The first reflection feature 13 is a specular reflection obscuring a portion of text 14 on the bio-data page 15. This is caused, for example, by a defect within the laminated structure of the bio-data page 15. FIG. 3B is a schematic illustration of an image of a passport bio-data page illuminated from a second direction $L_2$ to show a second reflection feature. The second reflection feature 16 is a specular reflection obscuring a portion of the photograph 17 of the holder of the bio-data page 15. This is caused, for example, by the inclusion of a reflective covert security feature within the bio-data page 15. FIG. 3C is a schematic illustration of an image of the passport bio-data page of FIGS. 3A and 3B with no reflection features visible. This image is formed from a comparison of the two images in FIGS. 3A and 3B and using a masking technique to select pixels revealing a reflection free image.

In order to utilise a masking approach to its fullest extent, it is preferably to ensure that the data collected in the first and second raw pixel data sets is as accurate as possible. To achieve this, two factors must be born in mind. Firstly, a document reader, such as a security document reader, has a limited footprint due to size restrictions in the environment in which it is used, which would typically be a desk or cubicle at a border inspection point. This then places constraints on the optical system within the document reader, as to enable illumination of an entire security document placed on the reader lighting source often need to be positioned adjacent a wall or corner of the housing of the document reader, as in the example given above. This causes a variation in the intensity of illumination of the security document with distance away from the lighting means, and consequently a spatial distribution of pixel intensity in image obtained. Secondly, the image capture device typically has an inherent non-linear response to intensity of illumination and color, leading to a variation between a real intensity for a particular shade and an ideal intensity for the same shade. For a methodology that relies on being able to select the darkest version of a pixel any discrepancy in illumination and/or color definition can have a detrimental effect on the data unless corrected.

Figure 4:
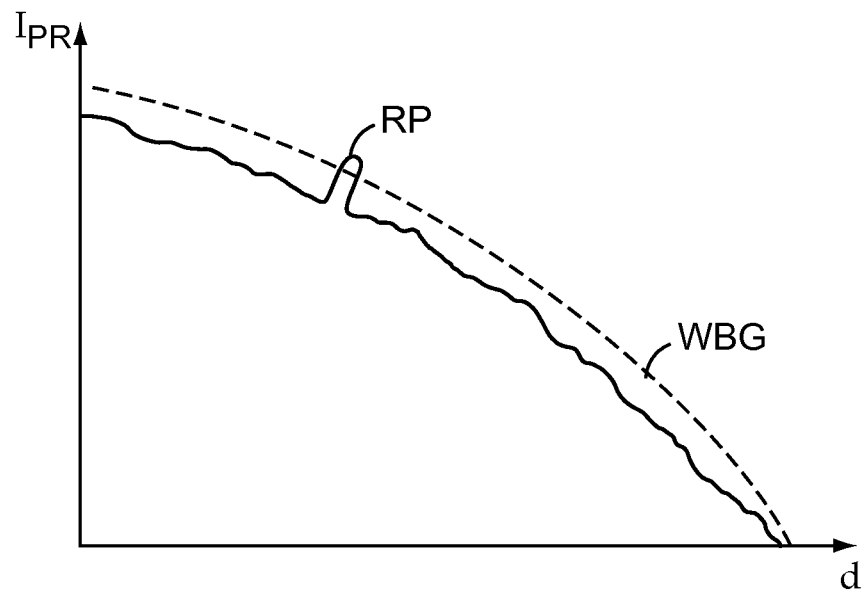
FIG. 4 is a chart illustrating the pixel intensity of a raw pixel data set $I_{PR}$ against distance d from the source of illumination.

FIG. 4 is a chart illustrating the pixel intensity of a raw pixel data set $I_{PR}$ against distance from the source of illumination d. This illustrates the effect of the spatial distribution of the light emitted from the lighting sources 3, 4, within the document reader 1 and incident on the security document 7. In this example, the lighting source 3 is positioned adjacent d=0, such that the highest pixel intensity of raw pixel data $I_{PR}$ occurs at this point. As the distance d away from the lighting source 3 increases the pixel intensity drops off substantially following a mean inverse square approximation. The relationship shown is appropriate for two lighting sources, whereas for a greater number of lighting sources the resulting intensity relationship is created using a mean inverse square approach resulting in a saddle-shaped intensity distribution. In this example, approximately half-way between the highest and lowest pixel intensities a reflection peak RP is seen. However, given the general noise within the data and the decreasing pixel intensity with distance d in this position it is likely that the reflection peak would be detected and the darkest pixel method used successfully. However, a peak found at an increased value of d, and therefore further into the region of decreasing pixel intensity may be harder to detect due to noise, and therefore calibration of the raw pixel data to avoid this is advisable.

This variation in pixel intensity can be corrected using a set of calibration pixel data. Each of the first and second raw pixel data sets will have an intensity distribution similar to that shown in FIG. 4. Also shown on FIG. 4 is a line marked "WBG" representing white background intensity. This is effectively the pixel intensity for a plain white background, such as a sheet of white paper or card, imaged using the document reader 1. By allocating pixel intensity in the WBG to represent the background value of pixel intensity in the raw pixel data sets, a set of calibration pixel data is created. When this set of calibration pixel data is combined with the raw pixel data in a mathematical operation as shown in Equation 1 below the pixel image data is returned:

$$\text{Output}=(255\times\text{Input})/(\text{WBG}+c) \qquad \text{Equation 1}$$

Output=output pixel intensity in pixel image data
Input=input pixel intensity in raw pixel data
255=maximum intensity value allocated to the cell in the image capture device
WBG=intensity of corresponding pixel in calibration pixel data
c=constant, greater than 0 and preferably 1, included to ensure that the Output value is not infinite.

Figure 5:
FIG. 5 is a chart showing the final pixel intensity $I_{PF}$ of the pixels in the first set of pixel image data (as an example) against distance d from the source of illumination.

This operation is completed for both the first set of raw pixel data and the second set of raw pixel data to obtain the first and second sets of image pixel data respectively. FIG. 5 is a plot showing the final pixel intensity $I_{PF}$ of the pixels in the first set of pixel image data (as an example) against distance from the source of illumination d. It can be seen that the background intensity is now substantially flat with increasing distance, and the reflection peak RP seen clearly above the background intensity, allowing the darkest pixel to be chosen easily and accurately. Since the two sets of raw pixel data are different, calibrating each of the first and second sets of raw pixel data comprises using a first set of image calibration pixel data to create a first set of image pixel data and using a second set of image calibration pixel data to create a second set of pixel image data respectively. Each pixel in the second set of image calibration pixel data corresponds to a pixel in the first set of image calibration pixel data, and each pixel in the first and second sets of image calibration pixel data corresponds to a pixel in each of the first and second sets of raw pixel data respectively.

The calibrated first and second sets of image pixel data may then be used to calculate a first set of final image data by using a masking technique to select between corresponding pixels in an image of the same point on the image of the security document. The masking technique is intended to remove the effects of "background noise" to successfully identify pixels representing reflections within a particular set of image pixel data. To enable this, a thresholding operation is carried out, where an arbitrarily chosen threshold is used to remove any noise and to identify bright pixels, thus effectively creating a mask. By considering the modulus of the difference in intensity between a first pixel in the first set of image pixel data and the corresponding pixel in the second set of image pixel data, it will be obvious if a reflection is present at such a position on the security document since the difference in intensity between the two pixels will be high. If this is greater than the threshold (more than background noise) it can be assumed that the brighter pixel represents a reflection, hence to retrieve an image where no reflection is present the "darkest" or lowest intensity pixel of the two is used as the output pixel, and included in the set of final image pixel data. However, if the modulus is below the threshold, a reflection is absent, and hence another criterion must be chosen to determine which of the pixels in the first image pixel data set or the second image pixel data set should be used in the set of final image data.

In an embodiment of the present invention, this is done by assessing the value of the corresponding pixels in the first and second calibration pixel sets. The calibration pixel data sets represent the background intensity rather than any artefact of the security document being imaged. In addition, there is greater noise in the pixels in a particular raw pixel data set with increasing distance d from the lighting means. This has the effect that, when a pixel is chosen, merely choosing the darkest pixel direct from the first image pixel data set or the second image pixel data set may lead to a poor quality pixel being chosen that yields little benefit in terms of final image quality. However, for regions where there is no reflection present, by determining which pixel in the first calibration data set and the second calibration set has the highest intensity and selecting the appropriate corresponding pixel from either the first or second image pixel data sets, the brightest pixel giving the best quality final image possible is yielded.

The operation may be done using a simple code loop as follows:

```
If
    |P₁ - P₂| > Threshold
then
    if P₁ > P₂
        P_output = P₂
    else P_output = P₁
else
    if W₁ > W₂
        P_output = P₁
    Else P_output = P₂
```

Where $P_1$ is a pixel in the first set of image pixel data, $P_2$ is the corresponding pixel in the second set of image pixel data. $P_{output}$ is the output pixel forming part of the final set of image pixel data. $W_1$ is the pixel in the first set of calibration data corresponding to the pixel in the first set of image pixel data, and $W_2$ is the pixel in the second set of calibration data corresponding to the pixel in the second set of image pixel data. $W_1$ and $W_2$ are therefore also corresponding pixels. The threshold is chosen arbitrarily, based on the maximum intensity of the image capture device used. For example, a CMOS device will typically have a maximum intensity of 255, hence a suitable threshold to remove any background noise would be approximately 10% of such a maximum, so around 30.

The code loop is repeated for as many times as is necessary to form a viable and useful image, which may be for all of the pixels in the first image pixel data set or for only a subset of these pixels. The resulting image may be used in various authentication and verification processes, since any reflections in the original images are attenuated, reduced or separated to the extent that further processing operations are reliable and reproducible.

Figures 6, 7:
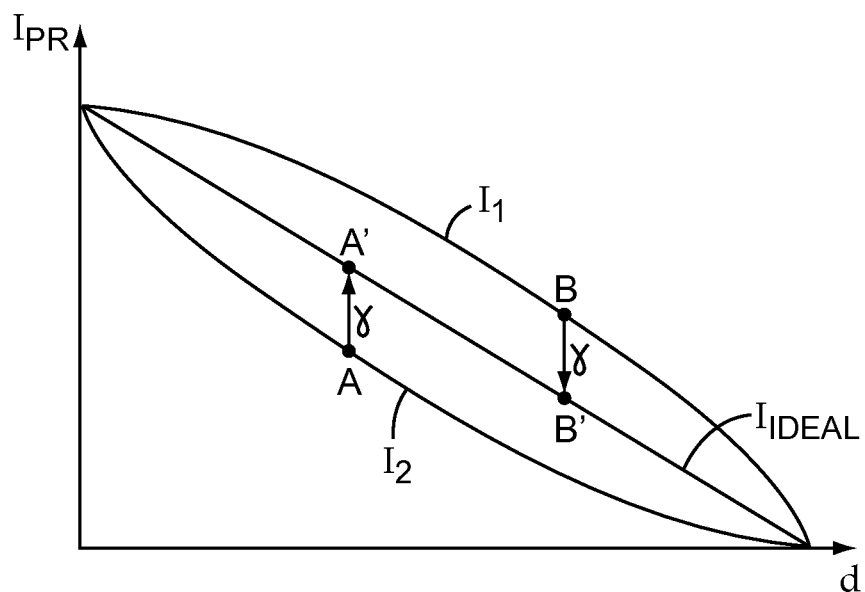
FIG. 6 is a chart showing pixel intensity $I_P$ against apparent greyness G (the response of the image capture device across the spectrum imaged) for decreasing pixel intensity.
FIG. 7 is a schematic example of the effect that gamma correction has on text within an image.

However, as is evident from FIG. 6, it may be desirable to make a further correction, such as a gamma correction, to take into account the inherent non-linear response to intensity of illumination and color, leading to a variation between a real intensity for a particular shade and an ideal intensity for the same shade. FIG. 6 is a chart showing pixel intensity $I_P$ against apparent greyness G (the response of the image capture device across the spectrum imaged) for decreasing pixel intensity. In the centre of the response range the non-linear behaviour of the image capture device is at its most stark— with the greatest deviation being either above ($I_1$) or below ($I_2$) the ideal intensity $I_{IDEAL}$. The direction in which the deviation occurs is an artefact of the image capture device used, hence both upper and lower deviations are illustrated here for the purposes of explanation. In order to ensure that the pixel intensity is as close to the ideal intensity as possible a correction factor, often known as gamma correction, is used. When applied to the pixel intensity at point A on curve $I_2$, the pixel intensity will be corrected to point A' on the line $I_{IDEAL}$, and when applied to the pixel intensity at point B on curve $I_2$, the pixel intensity will be corrected to point B' on the line $I_{IDEAL}$. Gamma correction is an exponential function typically in the form shown in Equation 2 below:

$$V_{out} = AV_{in}^{\gamma} \qquad \text{Equation 2}$$

Where $V_{out}$ is output, $V_{in}$ is input, A is a constant and γ is the gamma exponential correction factor. A gamma correction is applied to the first set of final image data if required to ensure that the data quality in the first set of final image data is as high as possible, making it ideal as a starting point for further processing as part of a document authentication process. FIG. 7 is a schematic example of the effect that gamma correction has on text within an image. The upper line of text contains a first group of letters 18 (all letter "A") corresponding to low illumination intensity (i.e. at a large distance d from the lighting source) and thus appear all in a lighter shade of gray, and a second group of letters 19 (all letter "A") corresponding to high illumination intensity (i.e. at a small distance d from the lighting means) and thus appear all in a darker shade of gray. Both groups 18, 19 are without gamma correction. The lower line of text contains a third group of letters 20 (all letter "A") corresponding to low illumination intensity (i.e. at a large distance d from the lighting source) and a fourth group of letters 21 (all letter "A") corresponding to high illumination intensity (i.e. at a small distance d from the lighting source), both with gamma correction. The effect of gamma correction on an image is that, for the letters in the third group 20 and fourth group 21, there is a greater contrast between individual shades, and a greater contrast between lighter shades (low illumination) and darker shades (bright illumination) in general (i.e. the contrast between the entire third group 20 and the entire fourth group 21).

Extraction of further image features, such as covert security features hidden within the security document being imaged, or further correction and enhancement of the raw image pixel data will now be described with respect to further embodiments of the present invention.

Although in the above embodiment no distinction is made in relation to the color of reflection under examination in a first further embodiment features may be separated, attenuated, highlighted or removed by considering brightest single color intensities as a complement to the masking approach outlined above. For specular reflections RGB (red, green and blue intensity) values are typically balanced out creating a bright white spot. However, for security features, often only one of the RGB values is maximised, since the feature is brighter in a single color only. So for the darkest only pixel approach outlined above, the pixel intensity has balanced red-green-blue components, since this corresponds to a white, specular reflection. For a security feature, the pixel intensity has un-balanced red-green-blue components. This may in fact be that pixel intensity has a maximum red, green or blue component.

Figures 8, 9:
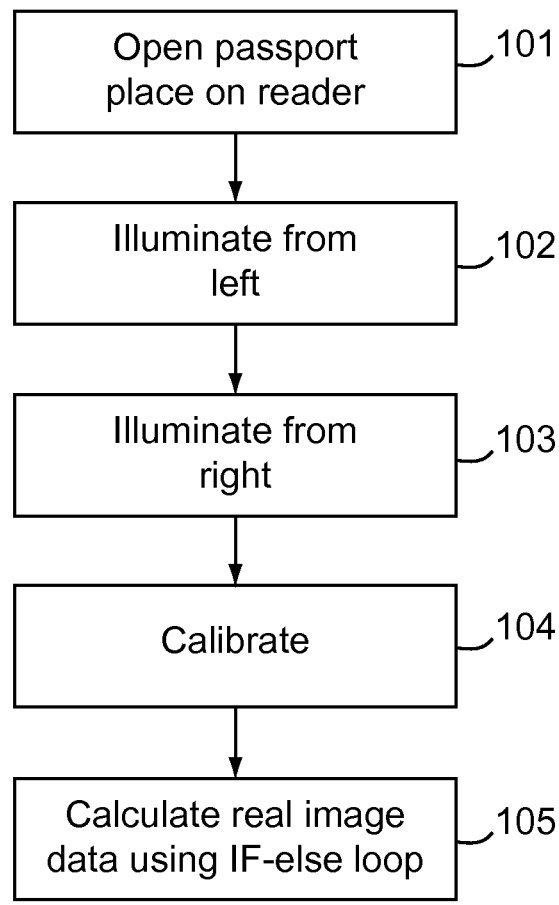
FIG. 8 is a schematic illustration of a portion of the color sensor array for an image capture device.
FIG. 9 is a flow chart illustrating the preferred embodiment of the present invention.

FIG. 8 is a schematic illustration of a portion of the color sensor array for an image capture device. This is typical of a CMOS-type device used in the embodiment above. Sensors are grouped into groups of four each comprising a red detector cell ($R_1$-$R_8$), a blue detector cell ($B_1$-$B_8$) and two green detector cells ($G_1$-$G_8$, $G'_1$-$G'_8$), representing a cell having a one-to-one relationship with a pixel in a final image. Each sensor detects the appropriate color, with two green detector sensors being included in each group to mimic the response of a human eye. The color response of a reflection, i.e. determination of a pixel having the brightest single color intensity, is measured by considering the response of individual sensors within each group and adjacent sensors within each group and/or adjacent groups. For example, a reflection with an intense blue component can be detected by merely looking at the response of the blue detector sensors or the red and green detector sensors (for the presence or absence of a response) or by looking at the response of adjacent blue detector sensors. For example, saturation of the blue $B_2$ sensor would result in the response of the blue $B_1$, $B_3$ and $B_5$ sensors being examined as strong response here would indicate a reflection peak. Consequently, by additionally measuring the color intensity of single color reflections by examining the color response of the pixels in the first and second sets of raw pixel data, for pixels representing the same point on the security document, the pixel with the brightest single color intensity can be selected and included in the first set of final image data. As an alternative to using the RGB color space it may be desirable to use a different color space, such as L*a*b*, since this mimics the natural response of the eye more accurately than RGB space, which is advantageous when an operator compares images on a screen and the actual security document.

In the examples given above, no correction is required for the effects of ambient lighting (i.e. light generated by the surrounds of the document reader rather than by the document reader), since typically document readers are used in an enclosed situation, for example, by providing a hood or lid covering the security document during illumination. However, in some circumstances, such as when a document reader is used in a booth or other open environment, it may be desirable to correct the image obtained by removing the intensity component attributable to ambient light. In a further embodiment of the present invention, this is done by creating a set of ambient pixel data by imaging the security document under no illumination other than ambient light. This may be achieved by placing the security document onto the glass platen 6 of the document reader 1 and without activating any of the lighting sources, capturing an image of the security document 7, thus creating the set of ambient pixel data. This set of ambient pixel data is then subtracted from each of the first and second sets of raw pixel data. This may be done at the same time as other calibration operations, beforehand or afterwards, but before the first or second sets of final image data are created.

As an example, the reflection removal technique was carried out using a commercially available security document reader, a QS1000 available in the UK from 3M United kingdom PLC, 3M Centre, Cain Road, Bracknell, Berkshire, RG12 8HT, UK. Minor modifications were made to the reader to split the existing array of light-emitting diodes (LEDs) into two separate half-arrays to ensure that two separate lighting sources were created. This was done by physically re-wiring the circuit board and including additional code in the software controlling the illumination to allow each half-array to be operated separately. In order to ensure that there was a one-to-one identity between corresponding pixels in any data sets obtained using either half-array, a mapping system was used to uniquely identify pixels. Each pixel was allocated a unique identifier based on its position with respect to an arbitrary x-axis corresponding to the front edge of the reader and an arbitrary-axis corresponding to a side edge of the reader, each identifier being of the format ($x_n$, $y_n$).

To test the reflection removal technique, the following steps were carried out, as shown in FIG. 9, a flow chart illustrating the preferred embodiment of the present invention. At step 101, a passport was opened to reveal the bio-data page, and placed face-down on the glass platen of the document reader. At step 102, the bio-data page was illuminated using the first half-array of LEDs from a first direction to capture the first raw pixel data set. At step 103, the bio-data page was illuminated from a second direction, different to the first, using the second half-array of LEDs to capture the second raw pixel data set. At step 104, the first and second sets of raw pixel data were calibrated using a set of image calibration pixel data to create a first set of image pixel data and a second set of pixel image data respectively. The set of calibration data was obtained initially when the document reader was set up to illuminate from two different directions by imaging a sheet of white 80 gsm paper. At step 105, a first set of final image data was calculated by comparing the first and second sets of image pixel data and for pixels representing the same point on the object, selecting the pixel with the lowest pixel intensity; and including said pixel in the first set of final image data. This was done by using the following loop:

```
For (x_n, y_n)
If
    |P_1 - P_2| > Threshold
then
    if P_1 > P_2
        P_output = P_2
    else P_output = P_1
else
    if W_1 > W_2
        P_output = P_1
    Else P_output = P_2
```

Repeat for all x ($x_1$-$x_1$) and y, ($y_1$-$y_n$) to create the first set of final image data comprising the OutputPixels for each (x, y). Once the first set of final image data was obtained, it was necessary to perform a gamma correction exercise to ensure that any effects of the response of the image capture device within the reader were minimised. To do this, before initial use, the image capture device was calibrated using a set of color reference targets available from X-Rite, 4300 44th St.

SE, Grand Rapids Mich. 49512, USA. The color reference targets comprise a set of greyscale targets with known RGB values, which in conjunction with image calibration software allow a matrix of y values to be calculated at certain points in the response of the image capture device. This matrix of y values was then applied to the first set of final image data to correct for any inherent response behaviour in the image capture device.

Although the technique was carried out using a passport bio-data page, it is also possible to image any other page of a passport, an identification card or a driver's licence, as examples of identity documents. Other security documents, such as fiduciary documents (for example, credit or bank cards) may also be imaged using this technique. In the above example, the processing to create the various sets of data is carried out within the FPGA (field-programmable gate array) of the document reader. However, this is merely a matter of preference, and the processing could alternatively be carried out in an ASIC (application-specific integrated circuit) if desired.

In the above embodiments, images are captured from different positions, such as from different angles. This is dictated by the physical construction of a passport reader, which has a dedicated footprint limited in size due to the constraints of the areas in which such readers are often situated. A typical full page passport reader has an approximate base size of 160 mm×200 mm and a height of approximately 190 mm. The lighting sources are typically placed adjacent a side wall, approximately 50 to 70 mm away from the wall, resulting in a typical angle of illumination in the range of 10° to 60° and typically around 40° to 50° (where the angle is measured at the surface of the security document being illuminated). This is relatively wide angle illumination compared with other image capture devices, such as cameras. Consequently the first and second positions from which the security document is illuminated and the images captured from are determined by the first and second illumination angle created by the position of the first and second lighting sources. However, it is possible to create illumination and/or image capture from different relative positions without using two separate lighting sources. For example, a single image capture device can be replaced with two or more image capture devices, in conjunction with a single lighting source. Alternatively, further optical paths can be created from either a single or multiple light source(s) using lenses, mirrors or prisms, with each optical path yielding a relative position from which the security document may be illuminated or an image captured. Creating different relative positions from which to illuminate the security document or from which to capture images of the security document may also be achieved by moving the security document and/or the image capture device relative to each other. This could be using a motor or vibrating either the security document (for example, by moving the glass platen) or the image capture device at a fixed frequency. Creating multiple relative positions from which either the security document can be illuminated or from which images can be captured is particularly useful for identifying holographic features. Further options could also include the use of plenoptic light field cameras or the use of microlens arrays to create multiple images that appear to be imaged from multiple angles.

In the embodiments described above, the approach of the present invention is applied to a security document reader to address issues involving reflections in security documents. However, the techniques may be used with other image capture devices (including, but not limited to, cameras—whether digital, video or otherwise—CMOS and CCD devices, mobile phones and other hand held devices, optical scanners, including flat bed scanners and other equipment that is capable of capturing an image) in which reflections arising from optical or physical defects or inconsistencies in the object being imaged occur. In the embodiments described above, the security document may be replaced by an object, for example a different type of document (in the case of a scanner), or a person or landscape scene (in the case of a camera). This may or may not be in contact with the image capture device, and the angle of illumination may be relatively narrow compared with the example of a passport reader above. However, illumination of the object or capture of an image of the object from at least two positions enables the darkest only pixel technique to be applied to remove reflections in images of the object. The code loops described above also apply equally well to other object types and image capture devices, since images of an object from different positions will always yield at least one image in which a reflection is present at a certain point and at least a second image where a reflection is absent at the same point, hence there will always be one bright and one dark corresponding pixel.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. An image enhancement method for an image capture device comprising:

illuminating an object placed on, in or adjacent to the image capture device and capturing an image of the object from a first position to obtain a first set of raw pixel data;

illuminating the object placed on, in or adjacent to the image capture device, capturing an image of the object from a second position, to obtain a second set of raw pixel data, where each pixel in the second set of raw pixel data corresponds to a pixel in the first set of raw pixel data representing a point on the object;

calibrating each of the first and second sets of raw pixel data using a first set of image calibration pixel data to create a first set of image pixel data and using a second set of image calibration pixel data to create a second set of pixel image data, wherein each pixel in the second set of image calibration pixel data corresponds to a pixel in the first set of image calibration pixel data, and each pixel in the first and second sets of image calibration pixel data corresponds to a pixel in each of the first and second sets of raw pixel data respectively;

for a first pixel in the first set of image pixel data:

i) calculating the modulus of the pixel intensity of said pixel in the first set of image pixel data minus the pixel intensity of the corresponding pixel in the second set of image pixel data and comparing the modulus to a predetermined threshold value;

ii) if the modulus is greater than the threshold value, selecting the one of the pixel in the first set of image pixel data and the pixel in the second set of image pixel data with the lowest pixel intensity as the output pixel;

iii) if the modulus is less than the threshold value, determining the one of the corresponding pixel in the first set of image calibration pixel data and the corresponding pixel in the second set of image calibration pixel data having the highest pixel intensity, and selecting the corresponding pixel in either the first set of image pixel data or the second set of image pixel data as the output pixel; and repeating steps i), ii) and iii) for at least a second pixel in the first set of image pixel data and forming a set of final pixel data from the resulting output pixels.

2. The image enhancement method of claim 1, wherein the object is illuminated with visible light, infra-red light or ultraviolet light.

3. The image enhancement method of claim 1, wherein when the object is illuminated with visible light, the object is illuminated with white light.

4. The image enhancement method of claim 3, wherein the pixel intensity includes balanced red-green-blue components.

5. The image enhancement method of claim 3, wherein the pixel intensity includes un-balanced red-green-blue components.

6. The image enhancement method of claim 3, wherein the pixel intensity includes a maximum red, green or blue component.

7. The image enhancement method of claim 1, further comprising:
for each pixel in the first and second sets of raw pixel data, measuring the intensity of single color reflections, and
for pixels representing the same region of the object, selecting the pixel with the brightest single color intensity; and including said pixel in a second set of final image data.

8. The image enhancement method of claim 1, further comprising:
adjusting the first and second sets of image pixel data with a gamma correction.

9. The image enhancement method of claim 1, wherein the image enhancement comprises the attenuation, separation or removal of reflections.

10. The image enhancement method of claim 1, wherein the image enhancement comprises the attenuation, separation or removal of specular reflections.

11. The image enhancement method of claim 1, further comprising:
for each of the first and second sets of raw pixel data, compensating the intensity values of each pixel for ambient light.

12. The image enhancement method of claim 10, further comprising:
creating a set of ambient pixel data by imaging the object under no illumination other than ambient light; and
subtracting the set of ambient pixel data from each of the first and second sets of raw pixel data.

13. The image enhancement method of claim 1, wherein the object is a security document.

14. The image enhancement method of claim 13, wherein the object an identity document or a fiduciary document.

15. The image enhancement method of claim 13, wherein the object is a passport, an identification card, or a driver's licence.

16. The image enhancement method of claim 13, wherein the image capture device is a security document reader.

17. The image enhancement method of claim 1, wherein the first position is different from the second position.

18. The image enhancement method of claim 17, wherein the first position is at a first angle relative to the object, and wherein the second position is at a second angle relative to the object.

* * * * *